(12) United States Patent
Bouchard

(10) Patent No.: US 11,916,776 B2
(45) Date of Patent: Feb. 27, 2024

(54) METHOD, APPARATUS AND COMPUTER-READABLE MEDIUM FOR MULTICAST COMMUNICATION IN A CONTAINERIZED ENVIRONMENT

(71) Applicant: GENETEC INC., Montreal (CA)

(72) Inventor: Jean Bouchard, Quebec (CA)

(73) Assignee: GENETEC INC., Montreal (CA)

( * ) Notice: Subject to any disclaimer, the term of this patent is extended or adjusted under 35 U.S.C. 154(b) by 84 days.

(21) Appl. No.: 17/510,751

(22) Filed: Oct. 26, 2021

(65) Prior Publication Data

US 2023/0131043 A1   Apr. 27, 2023

(51) Int. Cl.
*H04L 45/16* (2022.01)
*H04L 45/021* (2022.01)
*H04L 45/00* (2022.01)

(52) U.S. Cl.
CPC ............ *H04L 45/16* (2013.01); *H04L 45/021* (2013.01); *H04L 45/20* (2013.01)

(58) Field of Classification Search
None
See application file for complete search history.

(56) References Cited

U.S. PATENT DOCUMENTS

| | | | |
|---|---|---|---|
| 2010/0067527 A1* | 3/2010 | Watanabe | H04L 45/16 370/390 |
| 2014/0098813 A1 | 4/2014 | Mishra et al. | |
| 2016/0094353 A1* | 3/2016 | Sreeramoju | H04L 12/185 370/390 |
| 2017/0180250 A1* | 6/2017 | Shen | H04L 45/586 |

OTHER PUBLICATIONS

Written Opinion and International Search Report issued by the PCT Authorities dated Aug. 11, 2022 in connection with PCT application No. PCT/CA2022/050834, 11 pages.
Farhan Aly, "Deep Dive into Linux Networking and Docker—Bridge, vETH and IPTables", Sep. 11, 2021, retrieved on Aug. 9, 2022 from https://alv.arricaaq.com/linux-nctworkingbridge-iptables-and-docker/ sections: "Build Bridges, Not Walls", "How does Docker work?", "Host Networking", "MASQUERADE".

\* cited by examiner

*Primary Examiner* — Anh Ngoc M Nguyen

(57) ABSTRACT

A method for execution by a processor of a host having an external interface for connection to at least one other network element of a packet-based data network, the host storing a routing table and implementing a container connected to a bridge, the container being addressable by an internal address on a bridge network associated with the bridge. The method includes obtaining an indication of a request for the container to join a multicast group. In response to the obtaining, a request is sent via the external interface for the host to join the multicast group. The routing table may be modified so as to make the bridge a next hop for future packets obtained from the external interface and destined for the multicast group. The routing table may also be modified so as to make the external interface a next hop for future packets that are obtained from the bridge, whose source address is the internal address of the container and that are destined for the multicast group. The method also includes setting up an expiry parameter increase for such future packets.

20 Claims, 12 Drawing Sheets

METHOD, APPARATUS AND COMPUTER-READABLE MEDIUM FOR
MULTICAST COMMUNICATION IN A
CONTAINERIZED ENVIRONMENT

FIELD

The present description relates generally to data networks and, in particular, to multicast communication in a containerized environment.

BACKGROUND

It is often desirable to send multicast traffic in a network. In this way, traffic reaches multiple members of a multicast group, where it can be processed in different ways. This frequently occurs with video processing applications, where a camera issues video traffic for a multicast group and a host joins the multicast group to gain access to the video traffic.

It is also often desirable, for efficiency and security purposes, to implement a containerized environment. In essence, containers allow applications to be isolated from one another, with outside communication occurring via a common network bridge.

However, it is presently a problem to have multicast traffic reach and emanate from an application running on a container while a network bridge is used. This is because the network bridge hides the containers from the network, and there is no convenient way to associate the multicast group to a specific application.

SUMMARY

According to a first broad aspect, there is provided a method for execution by a processor of a host network element, the host network element having an external interface for connection to at least one other network element of a packet-based data network, the host network element storing a routing table in memory and implementing a container connected to a bridge. The method includes obtaining an indication of a request for the container to join a multicast group having a multicast group address; in response to the obtaining, sending via the external interface a request for the host network element to join the multicast group having the multicast group address; modifying the routing table so as to make the bridge a next hop for future packets obtained from the external interface and destined for the multicast group address; and setting up an expiry parameter increase for such future packets.

According to another broad aspect, there is provided a non-transitory computer-readable medium storing computer-readable instructions that are executable by a processor of a host network element, the host network element having an external interface for connection to at least one other network element of a packet-based data network, the host network element storing a routing table in memory and implementing a container connected to a bridge, wherein execution of the instructions by the processor causes the host network element to carry out the aforementioned method.

According to another broad aspect, there is provided a method for execution by a processor of a host network element, the host network element having an external interface for connection to at least one other network element of a packet-based data network, the host network element being addressable on the packet-based data network by an external address, the host network element storing a routing table in memory and implementing a container connected to a bridge, the container being addressable by an internal address on a bridge network associated with the bridge. Execution of the instructions by the processor causes the host network element to carry out the aforementioned method.

According to another broad aspect, there is provided a method for execution by a processor of a host network element, the host network element having an external interface for connection to at least one other network element of a packet-based data network, the host network element being addressable on the packet-based data network by an external address, the host network element storing a routing table in memory and implementing a container connected to a bridge, the container being addressable by an internal address on a bridge network associated with the bridge. The method includes modifying the routing table so as to make the external interface a next hop for future packets that are obtained from the bridge, whose source address is the internal address of the container and that are destined for a multicast group. The method also includes setting up an expiry parameter increase for such future packets. The method further includes setting up an address change whereby the source address of such future packets is replaced with the external address of the host network element.

According to another broad aspect, there is provided a host network element for use in a packet-based data network, comprising: a processor; a memory operatively coupled to the processor; an external interface operatively coupled to the processor and for connection to at least one other network element of the packet-based data network; the memory storing an external address by which the host network element is addressable on the packet-based data network, the memory further storing a routing table and non-transitory computer-readable instructions; the processor being configured to implement a container, a bridge and a bridge network, the container being addressable by an internal address on the bridge network, the processor being further configured to execute the instructions thereby to carry out the aforementioned method.

According to another broad aspect, there is provided a non-transitory computer-readable medium storing computer-readable instructions that are executable by a processor of a host network element, the host network element having an external interface for connection to at least one other network element of a packet-based data network, the host network element being addressable on the packet-based data network by an external address, the host network element storing a routing table in memory and implementing a container connected to a bridge, the container being addressable by an internal address on a bridge network associated with the bridge, wherein execution of the instructions by the processor causes the host network element to carry out the aforementioned method.

According to another broad aspect, there is provided a method for execution by a processor of a host network element, the host network element having an external interface for connection to at least one other network element of a packet-based data network, the host network element storing a routing table in memory and implementing a container connected to a bridge, the host implementing an internal interface for connection to the bridge. The method includes obtaining a packet from the external interface, the packet having a destination address that is a multicast group address. The method also includes increasing an expiry parameter of the packet. The method further includes consulting the routing table to identify the internal interface as a next hop for the packet. Also, the method includes sending the packet to the bridge via the internal interface.

According to another broad aspect, there is provided a host network element for use in a packet-based data network, comprising: a processor; a memory operatively coupled to the processor; an external interface operatively coupled to the processor and for connection to at least one other network element of the packet-based data network; the memory storing a routing table and non-transitory computer-readable instructions; the processor being configured to implement a container, a bridge and an internal interface for connection to the bridge, the processor being further configured to execute the instructions thereby to carry out the aforementioned method.

According to another broad aspect, there is provided a non-transitory computer-readable medium storing computer-readable instructions that are executable by a processor of a host network element, the host network element having an external interface for connection to at least one other network element of a packet-based data network, the host network element storing a routing table in memory and implementing a container connected to a bridge, the host implementing an internal interface for connection to the bridge, wherein execution of the instructions by the processor causes the host network element to carry out the aforementioned method.

According to another broad aspect, there is provided a method for execution by a processor of a host network element in a packet-based environment wherein each packet has a source address and a destination address, the host network element having an external interface for connection to at least one other network element of a packet-based data network. The method includes implementing a container, a bridge and a bridge network, the container being addressable on the bridge network by an internal address. The method also includes implementing a routing process isolated from the container by the bridge. The routing process itself includes obtaining a packet from the bridge, the packet having, as its source address, the internal address of the container on the bridge network and having, as its destination address, a multicast group address; increasing an expiry parameter of the packet; Identifying the external interface of the host network element as a next hop for the packet; replacing the source address of the packet with an address of the host network element; and sending the packet out of the host network element via the external interface.

According to another broad aspect, there is provided a host network element for use in a packet-based data network, comprising: a processor; a memory operatively coupled to the processor, the memory storing non-transitory computer-readable instructions; an external interface operatively coupled to the processor and for connection to at least one other network element of the packet-based data network; the processor being configured to execute the instructions thereby to carry out the aforementioned method.

According to another broad aspect, there is provided a non-transitory computer-readable medium storing computer-readable instructions that are executable by a processor of a host network element, the host network element having an external interface for connection to at least one other network element of a packet-based data network, wherein execution of the instructions by the processor causes the host network element to carry out the aforementioned method.

According to a further broad aspect, there is provided a method for execution by a processor of a host network element in a packet-based environment, the host network element implementing a container and a container engine, the container being addressable by an internal address used by the container engine. The method includes obtaining a packet having a source address, a destination address and an expiry parameter is obtained and, based on attributes of the packet, the packet is modified and sent to the internal interface or to an external interface of the host network element. It is noted that if the packet is obtained from the internal interface and the source address of the packet is the internal address of the container and the destination of the packet is a multicast group address, then (i) the aforementioned modifying leads to increasing the expiry parameter of the packet and setting the source address of the packet to be the address of the host, and (ii) the aforementioned sending leads to sending the modified packet to the external interface of the host network element.

According to another broad aspect, there is provided a host network element for use in a packet-based data network, comprising: a processor; a memory operatively coupled to the processor, the memory storing non-transitory computer-readable instructions; an external interface operatively coupled to the processor and for connection to at least one other network element of the packet-based data network; the processor being configured to implement a container and a container engine with an internal interface, the container being addressable by an internal address stored in the memory, the processor being further configured to execute the instructions thereby to carry out the aforementioned method.

According to another broad aspect, there is provided a non-transitory computer-readable medium storing computer-readable instructions that are executable by a processor of a host network element in a packet-based environment, the host network element implementing a container and a container engine, the container being addressable by an internal address used by the container engine, wherein execution of the instructions by the processor causes the host network element to carry out the aforementioned method.

BRIEF DESCRIPTION OF THE DRAWINGS

The above aspects will now be described in greater detail with reference to the accompanying drawings, in which.

The drawings are to be considered non-limiting.

DETAILED DESCRIPTION OF EMBODIMENTS

Figure 1:
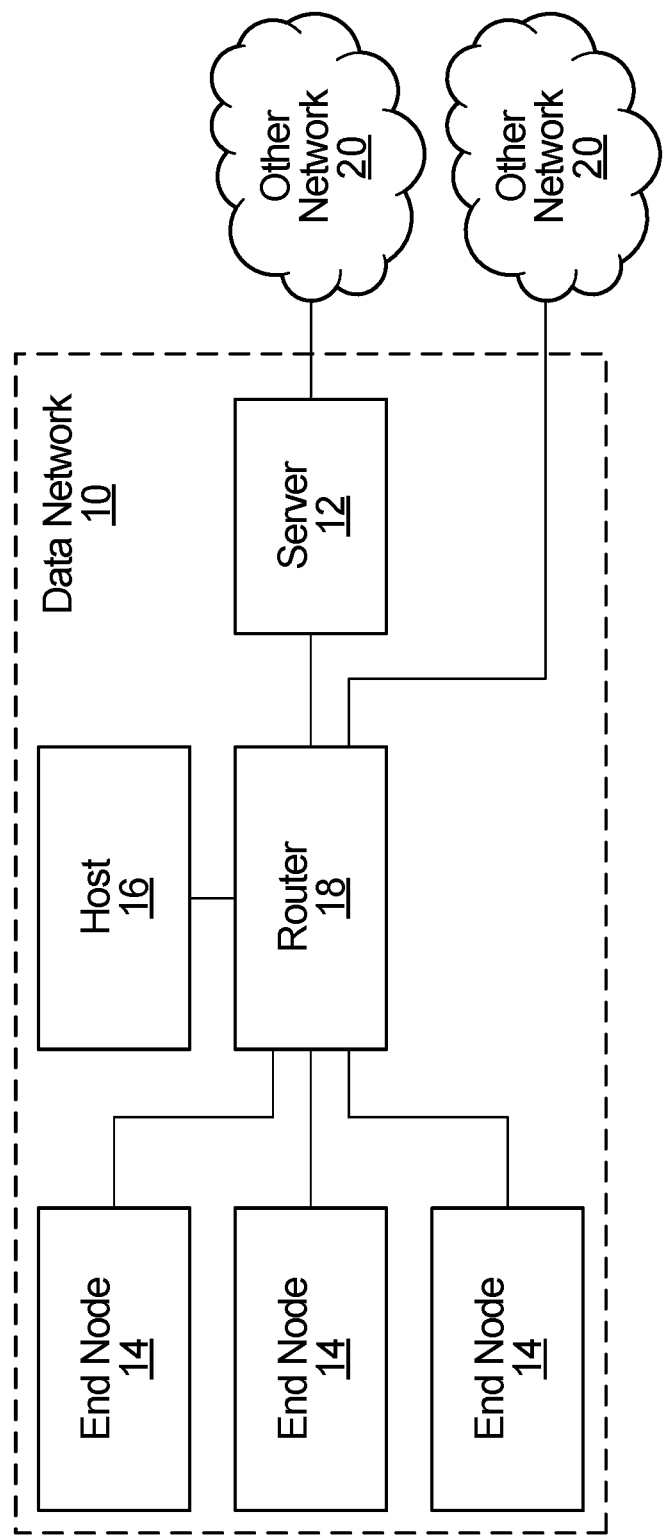
FIG. 1 is a block diagram of a data network comprising a plurality of network devices, including a host, in accordance with a non-limiting embodiment.

Referring to FIG. 1, there is shown a network architecture in which a plurality of network devices 12 are interconnected as part of a data network 10. The data network 10 could be a local area network (LAN), a wide area network (WAN), a campus area network (CAN), the public Internet etc. The data network 10 may be connected to at least one other network 20 via one or more of the network devices 12.

The network devices 12 include various end nodes 14 and a host network element 16 (or simply a "host"). The end nodes 14 can be sources or consumers of data traffic. In one non-limiting embodiment, the end nodes 14 can be security cameras that send video data over a secure link. In another non-limiting embodiment, the end nodes 14 can be web servers that stream digital music, gaming data or rendering instructions over the internet. Additional network elements (e.g., servers, switches, edge devices, routers, mobile devices, etc.) may also be part of the network architecture. For example, a router 18 may be located between the end nodes 14 and the host 16. The links that interconnect various network devices 12 may be wired or wireless.

Figure 7:
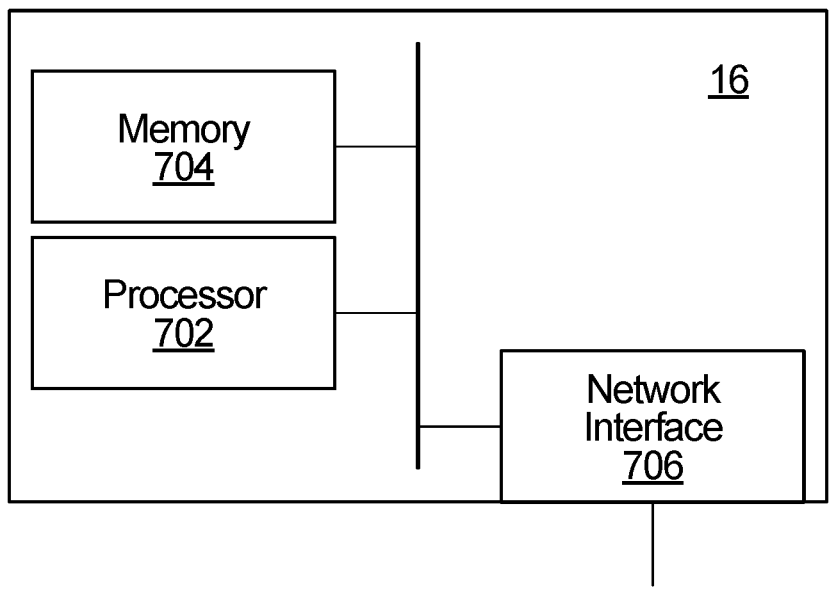
FIG. 7 is a block diagram showing various elements of a computing device, in accordance with a non-limiting embodiment.

The host 16 is used for processing some of the data traffic sent by the end nodes 14 (and arriving via the router 18), and may also be used for sending data traffic to other ones of the network devices (also via the router 18). In a non-limiting implementation, from a hardware perspective, and referring to FIG. 7, the host 16 includes a processor 702, a memory 704 and a network interface 706, all of which may be interconnected via an internal bus 708. The memory 704 stores computer-readable instructions that are read and executed by the processor 702, which causes the processor 702 to implement a variety of processes, as will be described below. The memory 704 also stores data structures (e.g., tables, databases, etc.) for use by such processes, as will also be described below.

Figure 2:
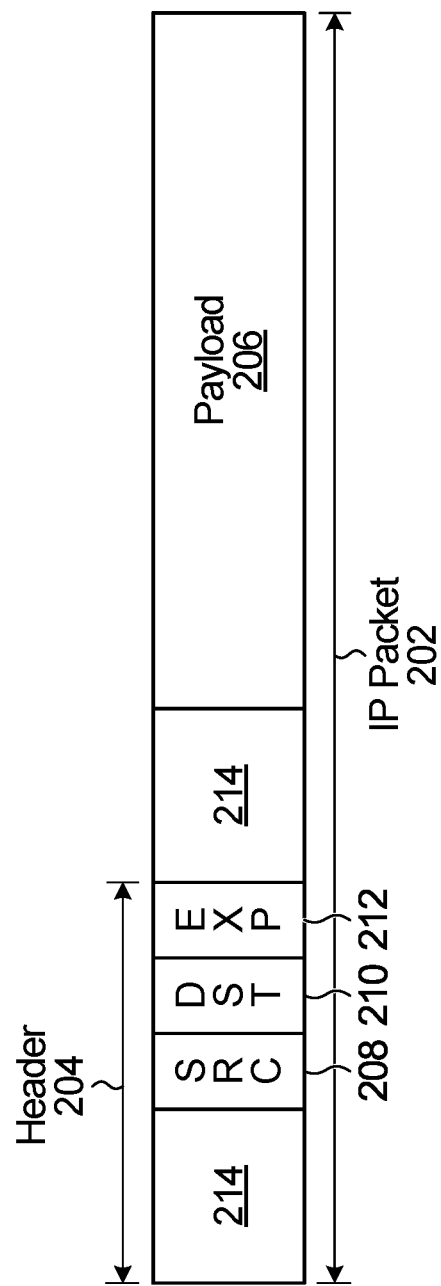
FIG. 2 shows an example of an IP packet with a header and a payload.

Some of the network devices 12 (e.g., the end nodes 14, the host 16 and the router 18) have a designated IP (Internet Protocol) address that can be static or dynamic. Such IP addresses are used to communicate data traffic via IP packets, examples of which include IPv4 packets (see RFC 790, hereby incorporated by reference herein) and IPv6 packets (see RFC 2460 and RFC 8200, hereby incorporated by reference herein). Referring to FIG. 2, there is shown an example IP packet 202, with a header 204 and a payload 206. The header 204 includes a source address 208 (the IP address of a device from which the packet originates), a destination address 210 (another IP address) and an expiry parameter (EXP) 212, among other information 214. The expiry parameter 212 is referred to as a time-to-live (TTL) in IPv4 and as a Hop Limit in IPv6. The payload 206 includes the data traffic of interest (e.g., video data, streaming digital music, gaming data, images, rendering instructions, documents, auto-discovery messages, etc.).

The expiry parameter 212 refers to a mechanism which limits how many times the packet can be retransmitted in the data network 10. The expiry parameter 212 may be implemented as a counter attached to or embedded in the header 204 of the IP packet 202. Once a prescribed event count has occurred for the IP packet 202, the data traffic (held in the IP packet's payload 206) is discarded or revalidated.

Figure 3:
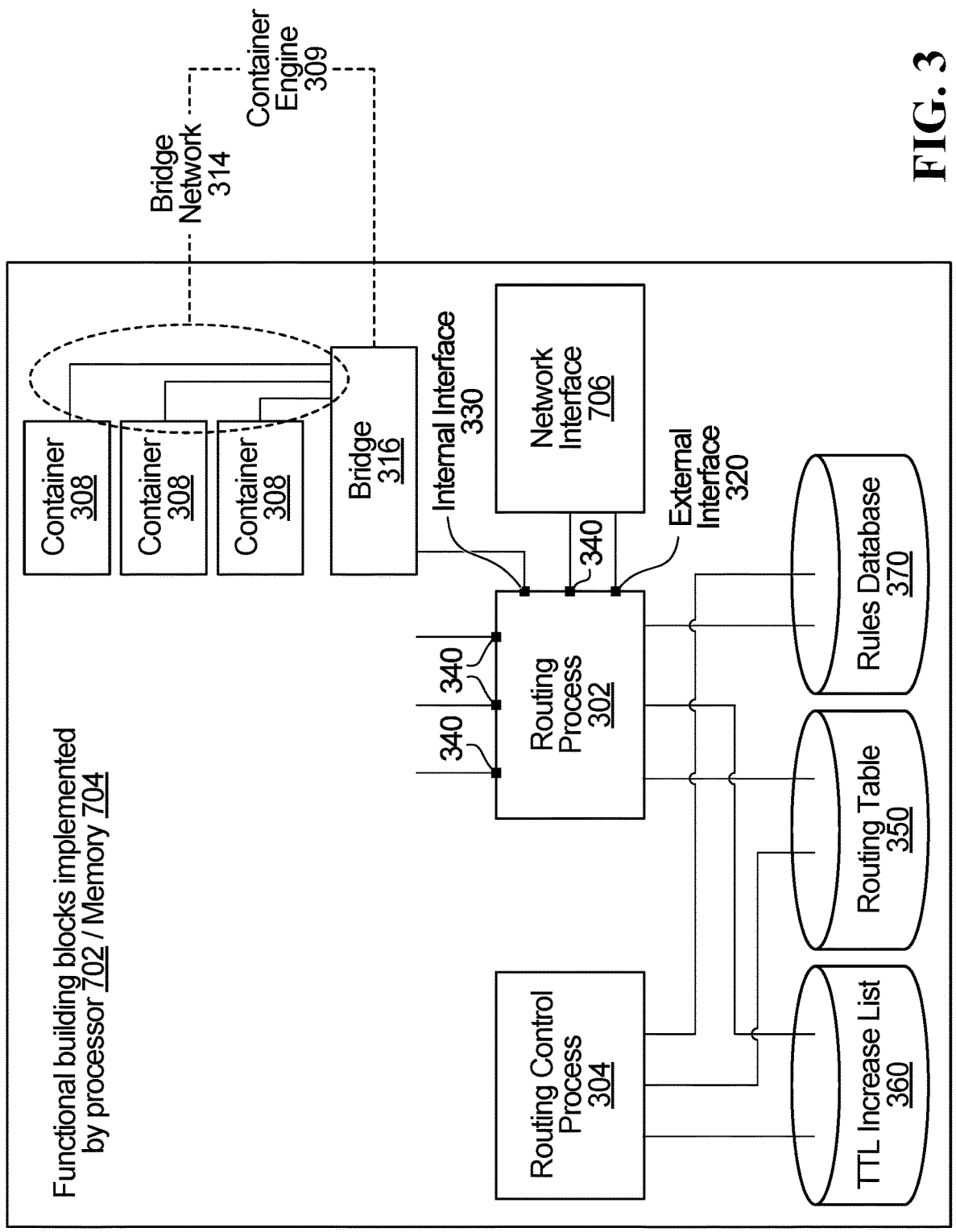
FIG. 3 is a block diagram of processes and data structures implemented by the host, including a routing process, a routing control process, a bridge and a plurality of containers, in accordance with a non-limiting embodiment.

Referring now to FIG. 3, there is shown a functional block diagram of various processes and data structures implemented by the processor of the host, in accordance with a non-limiting embodiment. The processes include a routing process 302, a routing control process 304 and a containerized environment.

The containerized environment includes a plurality of containers 308 and a container engine 309. The various containers 308 run any number of applications, which can include applications for consuming and/or generating IP packets. A container is a unit of software that packages code and its dependencies so the application runs reliably irrespective of the underlying computing platform/native operating system. In particular, the container engine 309 is configured to unpack various files and meta-data required for a given container, then hands them off to the kernel (described herein below). The container engine 309 may implement a bridge network 314 and a (software) bridge 316. Each of the containers 308 has an internal address on the bridge network 314 as known to the bridge 316; this could be a MAC address, for example. The bridge network 314 uses the bridge 316 to allow containers connected to the same bridge network (i.e., containers 308) to communicate, while providing isolation from containers that are not connected to the bridge network 314 (no such containers are illustrated in FIG. 3). As such, the containers 308 are isolated from the routing process 302, and each container 308 is reachable by the routing process 302 based on rules inserted into the routing process 302 by the container engine 309 (and the bridge 316 in particular). A non-limiting example of a suitable container engine is Docker, available from Docker, Inc., 3790 El Camino Real #1052, Palo Alto, California, 94306. Other examples of a container engine include CRI-O, Railcar, RKT, Podman and LXC. However, these examples are not to be construed as limiting.

The illustrated non-limiting embodiment also provides a plurality of interfaces to which the routing process 302 is connected. In this case, an external interface 320 connects the routing process 302 to the router 18, and an internal interface 330 connects the routing process 302 to the bridge 316. The external interface 320 and the internal interface 330 are each associated with a respective IP address known to the routing process 302. Other external and internal interfaces 340 may be provided. The routing process 302 (which may be implemented as part of the host's operating system, or "kernel") is configured to handle IP packets obtained/received via the internal and external interfaces 320, 330, 340. Specifically, the routine process may be configured to process an obtained/received packet, possibly modify it and possibly output it through one or more of the external and/or internal interfaces 320, 330, 340.

The routing process 302 accesses various ones of the data structures in the memory to accomplish its functions. Such data structures may include a routing table 350, a list (referred to as a "TTL increase list") 360 and a rules database 370. These are now described in some detail, with the understanding that "table", "list" and "database" are expressions that refer to non-limiting examples of data structures, and that equivalent ways of representing data may of course be used.

Figure 8:
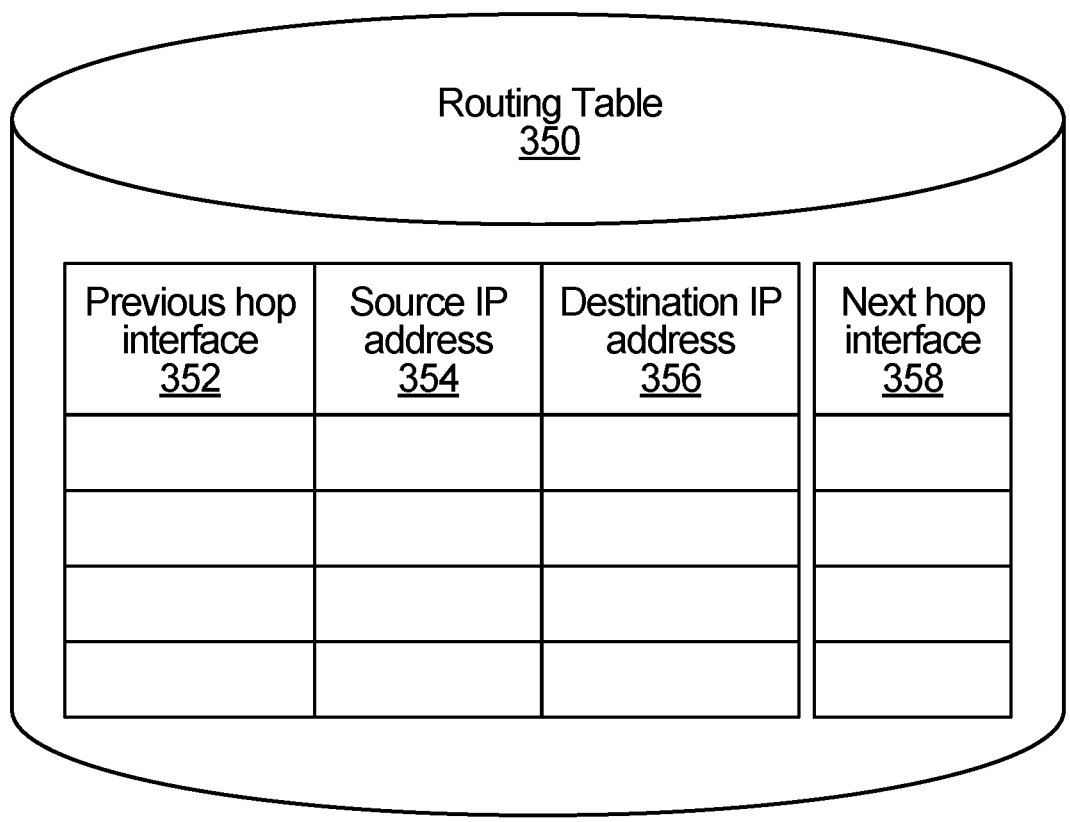
FIG. 8 shows an example of a routing table, in accordance with a non-limiting embodiment.

Referring to FIG. 8, the routing table 350 is a data structure that provides the identity of an interface (the "next hop" 358) towards which an IP packet obtained via a certain interface (the "previous hop" 352) and having a certain source IP address 354 and destination IP address 356 is to be routed. Each of the previous hop 352 and the next hop 358 can be an internal interface (such the internal interface 330 leading to the bridge 316) or an external interface (such as the external interface 320 leading to the network interface 706). The next hop 358 may even include multiple interfaces (internal and/or external) to which to send an IP packet under certain conditions.

A distinction can be made between a "unicast" routing table (used for routing one-to-one traffic) and a "multicast" routing table (used for routing one-to-many, i.e., multicast, traffic). Multicast traffic can be viewed as data traffic made up of IP packets for which the destination IP address is not the IP address of a particular network device, but rather identifies a "multicast group" that is known to interested recipients of the data traffic, of which there may be many, and at different points in the network. As such, one way in which a multicast routing table may differ from a unicast routing table is that there may be more than one interface specified as the next hop.

In view of the foregoing, one of the functions carried out by the routing process 302 is to process an IP packet obtained from outside the host (e.g., received/obtained at the external interface 320, referred to as an "inbound" IP packet) or from one of the containers 308 (e.g., received/obtained at the internal interface 330 from the bridge 316, referred to as a "container-issued" IP packet) by checking the appropriate routing table (unicast or multicast) to determine the next hop where the IP packet must be sent (e.g., external interface or internal interface(s)); and sending the IP packet to the next hop.

Another one of the functions carried out by the routing process 302 includes modifying the expiry parameter (e.g., time-to-live (TTL) or hop limit) of an IP packet. In some embodiments, as will be described below, the expiry parameter 212 of the IP packet 202 is to be increased if the IP packet 202 is a multicast packet whose multicast group address is on a list of multicast group addresses, referred to as the "TTL increase list" 360. Adding a particular multicast group address to (or removing it from) the TTL increase list 360 is carried out by the routing control process 304.

Turning now to the rules database 370, this data structure includes a set of rules that the routing process 302 is to follow when routing incoming and outgoing data traffic. The set of rules could include a rule for modifying the source IP address or destination IP address of an IP packet before sending it to an internal or external interface. In a Linux environment, the rules codified by the rules database 370 may be referred to as "iptables rules". One example of an iptables rule can be a rule whereby the source IP address of an IP packet is to be set to the IP address of the host 16 before sending that IP packet to the external interface 320. Creation or deletion of individual rules in the rules database 370 is carried out by the routing control process 304.

By carrying out the above functions such as adding multicast group addresses to (or removing them from) the TTL increase list 360 and creating or deleting rules in the rules database 370, the routing control process 304 (which can also be referred to as a routing "daemon") makes changes in the memory 704 that alter the outcome of the routing process 302. In addition, the routing control process 304 can be configured to instruct the routing process 302 to send control messages 390 to the router 18 (e.g., via the external interface 320) and to the containers 308 (e.g., via the internal interface 330 and the bridge 316).

In accordance with certain non-limiting embodiments, a particular container 308P may wish to join a specific multicast group, i.e., the particular container 308P may wish to be the recipient IP packets that have, as their destination IP address, the address of the specific multicast group. The address of the specific multicast group (i.e., the specific multicast group address) may be/become known to the host 16 in various ways, including online resources, industry-wide manufacturer codes or user input. Accordingly, and with reference to FIG. 4, the particular container 308P may issue a multicast join request 402, which is a request for the container to join a multicast group having the specific multicast group address.

In a non-limiting embodiment, such as may be applicable to an IPv4-based network, sending the multicast join request 402 may involve the particular container 308 sending a so-called "IGMP request" to the routing process 302 (via the bridge 316). An IGMP request is a message in accordance with the Internet Group Membership Protocol (described in RFCs 1112, 2236, 3376 and 4604, hereby incorporated by reference herein) that specifies the IP address of the requester and a multicast group that the requester wants to join (i.e., that identifies the multicast group address of multicast packets that the requester wants to receive).

It should be appreciated that a similar situation and an analogous exchange of messages would be applicable to an IPv6-based network, whereby instead of implementing IGMP, the various network entities could implement Multicast Listener Discovery (MLD) protocol, as described in RFCs 2710, 3590 and 3810, and hereby incorporated by reference herein.

Consider now that the multicast join request 402 (e.g., an IGMP request or an MLD request) has been issued by the particular container 308P, where the multicast join request indicates a specific multicast group address (denoted "MG") that the particular container 308P wants to listen to. This could be a multicast group address that is known (by the particular container 308P) to be used by a given end node.

Upon receipt of the multicast join request 402 (which can be an IGMP request in the case of an IPv4-based network or an MLD request in the case of an IPv6-based network) from the particular container 308P (via the bridge 316), the routing process 302 issues a notification 404 to the routing control process 304. The notification 404 can be delivered as a change in a parameter in software. According to certain embodiments, which will now be described, the routing control process 304 is carefully designed to respond to such a notification.

Figure 4:
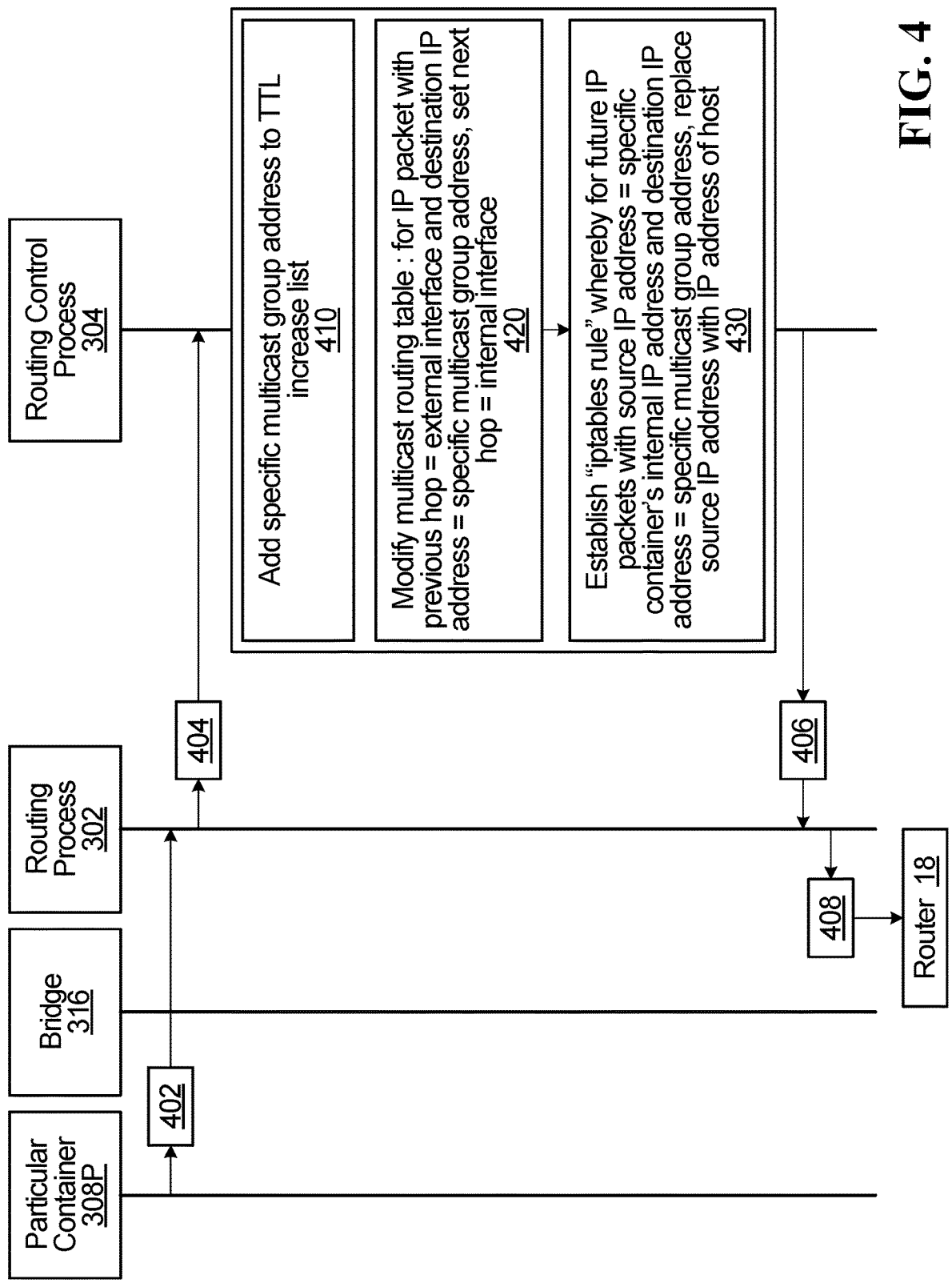
FIG. 4 is a flowchart showing a series of actions performed by the routing control process in response to being notified of a container's request to join a multicast group, in accordance with a non-limiting embodiment.

Routing Control Process Responding to Container-Issued Request to Join Multicast Group With continued reference to FIG. 4, there is shown a series of actions performed by the routing control process 304 in response to being notified of the multicast join request 402 by the routing process 302. These actions need not be performed in the order described.

At block 410, the routing control process 304 adds the specific multicast group address MG to the TTL increase list 360 (i.e., the list of multicast group addresses for which the routing process 302 needs to increase the expiry parameter).

At block 420, the routing control process 304 edits/modifies the multicast routing table 350 to add an entry to reflect the situation where, for an inbound IP packet received/obtained from the router 18 (i.e., the previous hop 352 is the external interface 320) that has the specific multicast group address MG as its destination IP address 356, the next hop 358 is set to be the internal interface 330 (leading to the bridge 316). Also, the routing control process 304 edits the multicast routing table 350 to reflect the situation where, for container-issued IP packet obtained from the bridge 316 (i.e., the previous hop 352 is the internal interface 330) that has the specific multicast group address MG as its destination IP address 356, the next hop 358 is set to be the external interface 320 (leading to the router 18).

At block 430, the routing control process 304 edits/modifies the rules database 370. Specifically, the routing control process 304 establishes an "iptables rule" such that, for future container-issued IP packets having the specific container's internal IP address as the source IP address and the specific multicast group address MG as the destination IP address, the routing process 302 will replace the packet's source IP address with the IP address of the host 16 (this can be referred to as "masquerading").

Thereafter, the routing control process 304 sends a message 406 to the routing process 302 to cause the routing process 302 to send a new multicast join request 408. This new multicast join request 408 is sent to the router 18 and indicates that the host 16 wishes to join the multicast group associated with the specific multicast group address MG. The new multicast join request 408 may be in accordance with the IGMP protocol (for IPv4) or the MLD protocol (for IPv6), originating from the host, and including the specific multicast group address MG. The message can be sent as a change in a parameter in software.

Routing Process Responding to Inbound IP Packet Containing Data Traffic

Figure 5:
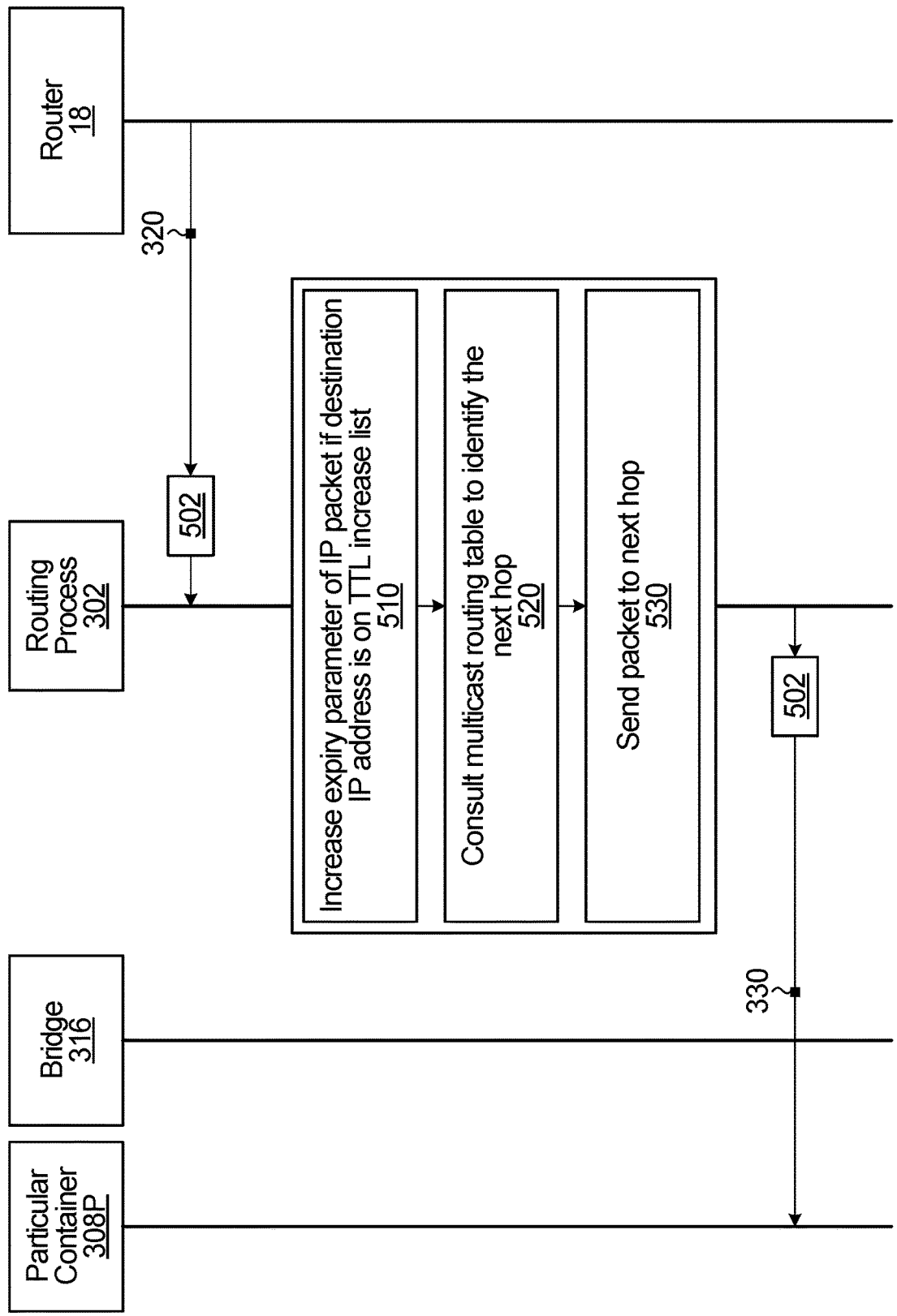
FIG. 5 is a flowchart showing actions carried out by the routing process to deal with an IP packet obtained via an external interface and destined for the specific multicast group, in accordance with a non-limiting embodiment.

Actions carried out by the routing process 302 to deal with a subsequently obtained inbound IP packet (i.e., received from the external interface 320) whose destination IP address is the specific multicast group address MG will now be described with reference to FIG. 5. These actions need not be performed in the order described.

At block 510, the routing process checks the TTL increase list 360 and increases the expiry parameter of the IP packet 502 if the destination IP address is on the TTL increase list 360. In this example, since the specific multicast group address MG is considered to be on the TTL list 360 (as mentioned above), the routing process 302 increases (e.g., increments) the expiry parameter (e.g., time-to-live or hop limit) of the IP packet 502 by changing the data in its header.

At block 520, the routing process 302 consults the multicast routing table 350 to identify the next hop. In this case, based on the specific multicast group address MG (and on the fact that the IP packet 502 was obtained from the external interface 320), the next hop is identified as being the internal interface 330 which leads to the bridge 316.

At block 530, the routing process 302 sends the IP packet 502 to the next hop, which is in this case the bridge 316 reachable via the internal interface 330.

The bridge 316 knows that the particular container 308P expressed an interest in joining the specific multicast group because, as will be recalled, the bridge 316 had previously received the multicast join request 402 from the particular container and relayed it to the routing process 302. As such, when the bridge 316 obtains the aforementioned IP packet 502 from the routing process 302 (as a result of block 530), the bridge 316 determines, from information in the header of the IP packet 502 (including, possibly, the specific multicast group address MG) that the IP packet 502 is to be sent to the particular container 308P. As such, the IP packet 502 is delivered to the particular container 308P at its internal address on the bridge network 314 (e.g., its MAC address or other layer 2 address, which is known to the bridge 316) and, upon receipt at the particular container 308P, the IP packet 502 is processed in accordance with the relevant application.

Figure 6:
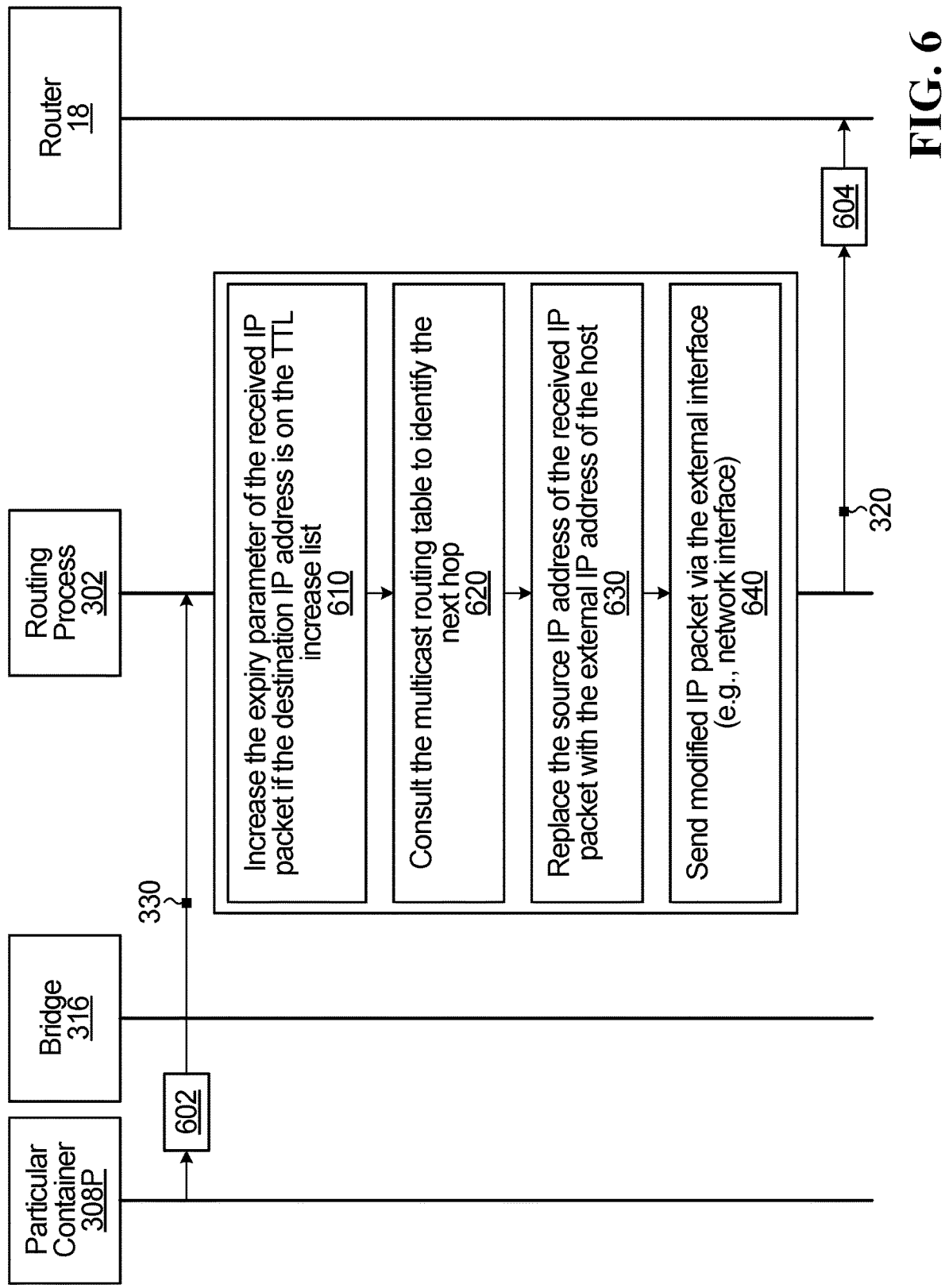
FIG. 6 is a flowchart showing actions carried out by the routing process to deal with a container-issued IP packet obtained via the bridge, in accordance with a non-limiting embodiment.

Routing Process Responding to Container-Issued IP Packet Containing Data Traffic It is also envisaged that the particular container 308P may issue IP packets belonging to a given multicast group identified by a new multicast group address NG. (It is assumed that the new multicast group address NG is already on the TTL increase list 360.) Such container-issued IP packets have, as their source IP address, the internal IP address of the specific container 308P and have, as their destination IP address, the new multicast group address NG. Referring to FIG. 6, such container-issued packets 602 are received/obtained by the routing process 302 via its internal interface 330, which is connected to the bridge 316 that connects to the particular container 308P. Actions carried out by the routing process 302 in these circumstances are now described with continued reference to FIG. 6. These actions need not be performed in the order described.

At block 610, the routing process 302 checks the TTL increase list 360 and increases the expiry parameter of the obtained IP packet 602 if the destination IP address is on the TTL increase list 360. In this case, since the obtained packet 602 is destined for the new multicast group address NG (and since the new multicast group address NG is already on the TTL increase list 360, as previously mentioned), the expiry parameter of the obtained IP packet 602 is changed as appropriate (e.g., increased or incremented).

At block 620, the routing process 302 consults the multicast routing table 350 to identify the next hop. In this case, based on the fact that the destination IP address of the IP obtained packet 602 is the new multicast group address NG (and also based on the fact that the IP packet 602 was obtained via the internal interface 330), the next hop is identified to be the external interface 320, i.e., it is determined that the obtained IP packet 602 should be transmitted via the external interface 330, which is connected to the router 18.

However, before doing so, at block 630, the routing process 302 replaces the source IP address of the obtained IP packet 602 with the external IP address of the host 16 (this can be referred to as "masquerading"). This results in a modified IP packet 604.

At block 640, the routing process then sends the modified IP packet 604 via the external interface 320, leading to the router 18.

The modified IP packet 604 reaches the router 18 where it is routed according to its own multicast routing table, as if there had been no intervention by the host 16.

Figure 9:
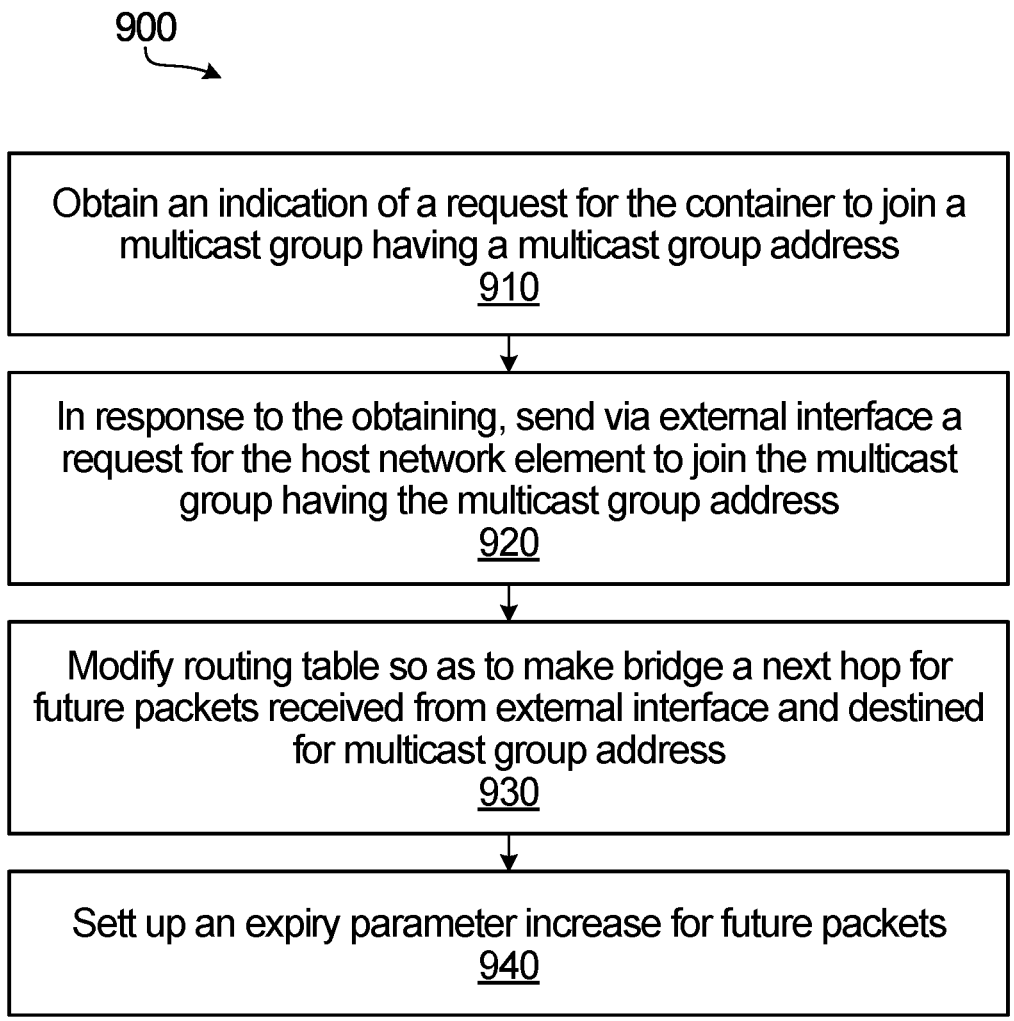
FIGS. 9-10 are flowcharts showing actions carried out by a routing control process, in accordance with various non-limiting embodiments.

In summary, referring to FIG. 9, there has been described a method 900 for execution by a processor of a host network element, the host network element having an external interface for connection to at least one other network element of a packet-based data network, the host network element storing a routing table in memory and implementing a container connected to a bridge.

At step 910 of the method 900, an indication of a request for the container to join a multicast group having a multicast group address is obtained.

At step 920 of the method 900, in response to the obtaining, a request for the host network element to join the multicast group having the multicast group address is sent via the external interface.

At step 930 of the method 900, the routing table is modified so as to make the bridge a next hop for future packets obtained from the external interface and destined for the multicast group address.

At step 940 of the method 900, an expiry parameter increase is set up for such future packets.

Figure 10:
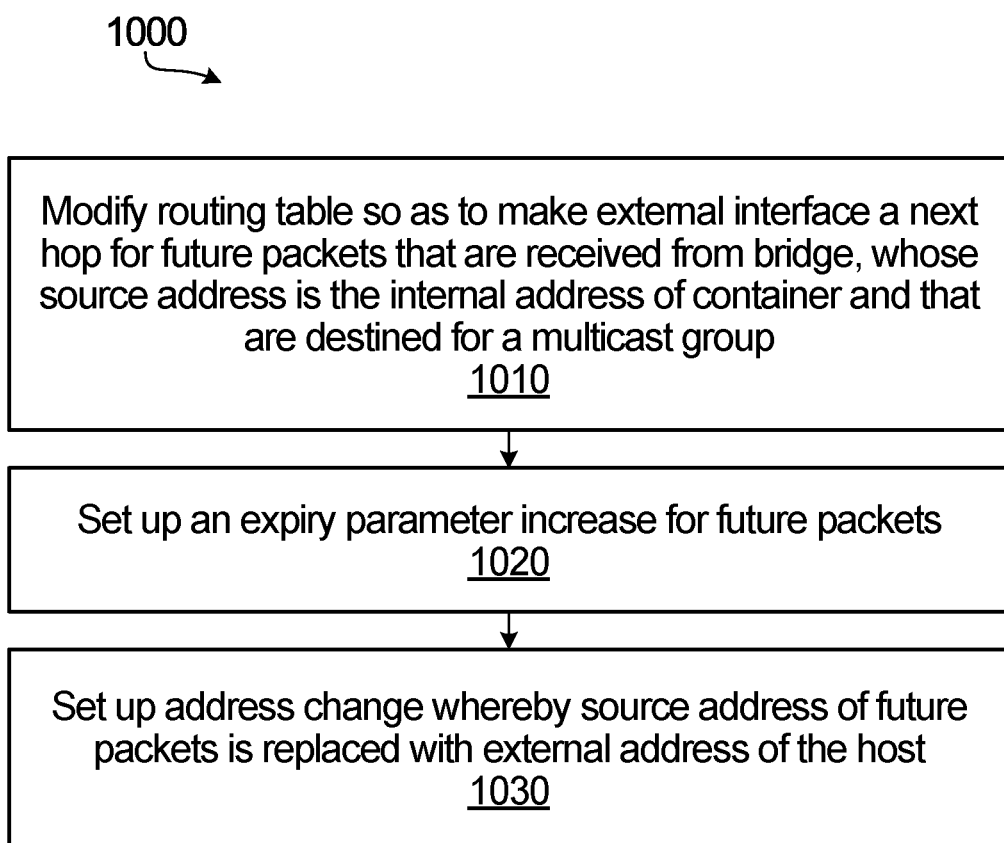

Referring to FIG. 10, there has been described a method 1000 for execution by a processor of a host network element, the host network element having an external interface for connection to at least one other network element of a packet-based data network, the host network element being addressable on the packet-based data network by an external address, the host network element storing a routing table in memory and implementing a container connected to a bridge, the container being addressable by an internal address on a bridge network associated with the bridge.

At step 1010 of the method 1000, the routing table is modified so as to make the external interface a next hop for future packets that are obtained from the bridge, whose source address is the internal address of the container and that are destined for a multicast group.

At step 1020 of the method 1000, an expiry parameter increase is set up for such future packets.

At step 1030 of the method 1000, an address change is set up whereby the source address of such future packets is replaced with the external address of the host network element.

Figure 11:
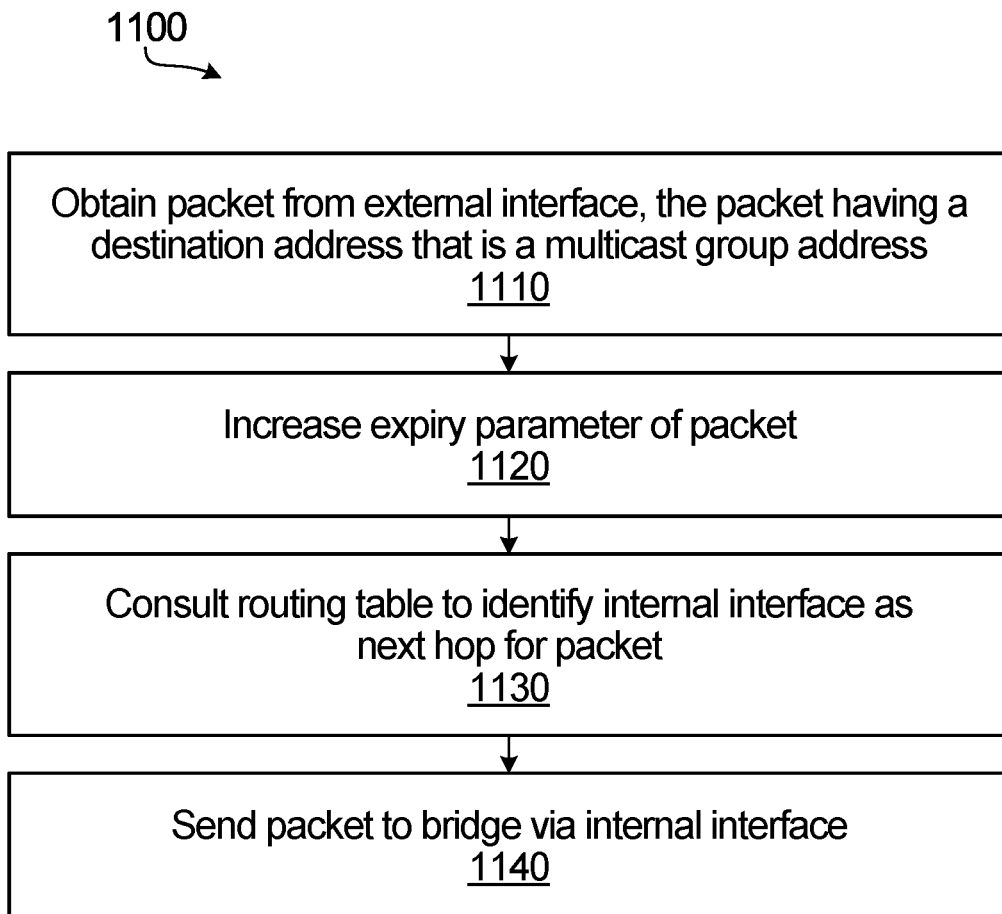
FIGS. 11-13 are flowcharts showing actions carried out by a routing process, in accordance with various non-limiting embodiments.

Referring to FIG. 11, there has been described a method 1100 for execution by a processor of a host network element, the host network element having an external interface for connection to at least one other network element of a packet-based data network, the host network element storing a routing table in memory and implementing a container connected to a bridge, the host implementing an internal interface for connection to the bridge.

At step 1110 of the method 1100, a packet is obtained from the external interface, the packet having a destination address that is a multicast group address.

At step 1120 of the method 1100, an expiry parameter of the packet is increased.

At step 1130 of the method 1100, the routing table is consulted to identify the internal interface as a next hop for the packet.

At step 1140 of the method 1100, the packet is sent to the bridge via the internal interface.

Figure 12:
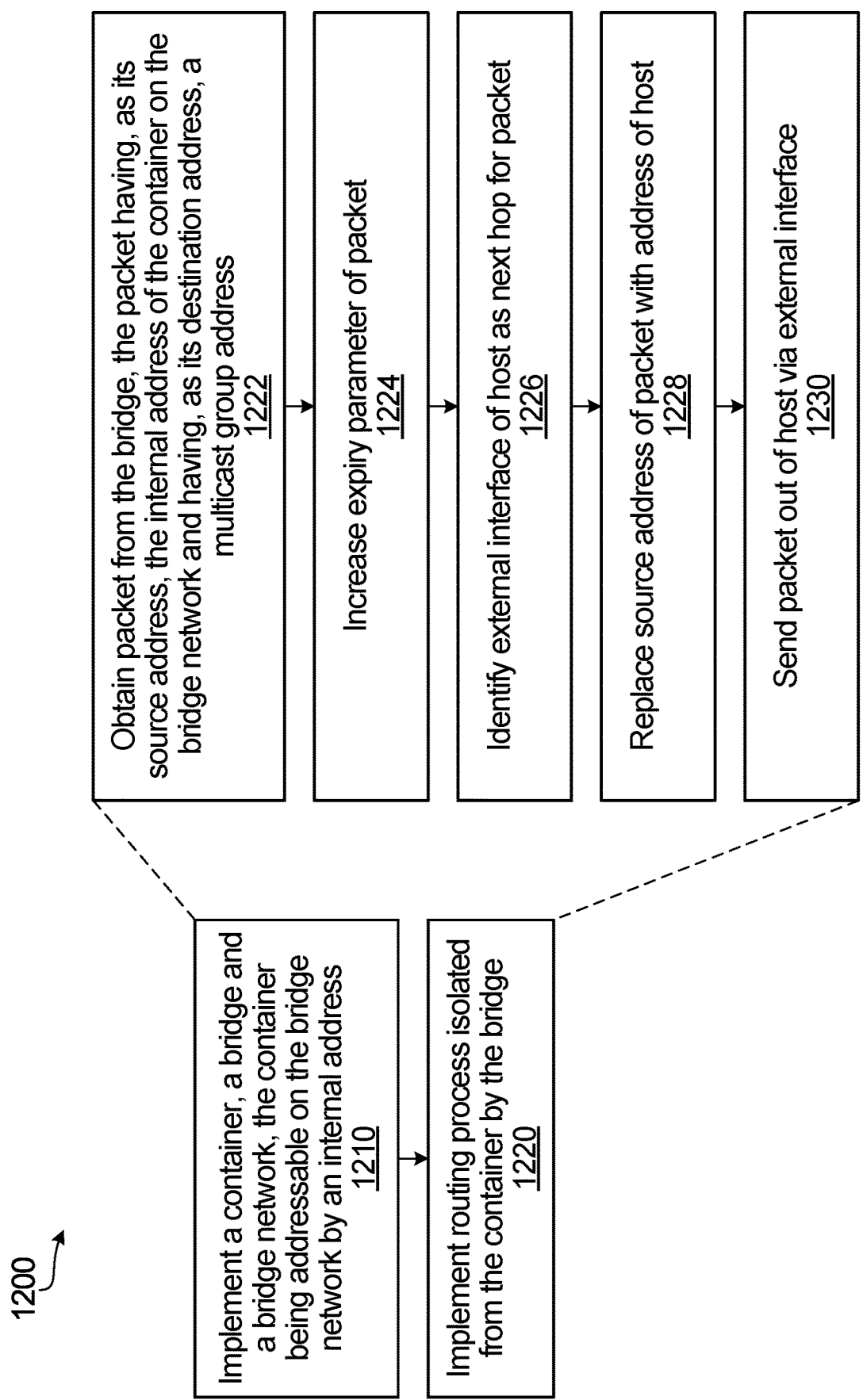

Referring to FIG. 12, there has been described a method 1200 for execution by a processor of a host network element in a packet-based environment wherein each packet has a source address and a destination address, the host network element having an external interface for connection to at least one other network element of a packet-based data network.

At step 1210 of the method 1200, a container, a bridge and a bridge network are implemented, the container being addressable on the bridge network by an internal address.

At step 1220 of the method 1200, a routing process isolated from the container by the bridge is implemented.

The routing process itself includes several steps, including:

Step 1222, whereby a packet is obtained from the bridge, the packet having, as its source address, the internal address of the container on the bridge network and having, as its destination address, a multicast group address;

Step 1224, whereby an expiry parameter of the packet is increased;

Step 1226, wherein the external interface of the host network element is identified as a next hop for the packet;

Step 1228, whereby the source address of the packet is replaced with an address of the host network element; and Step 1230, whereby the packet out is sent of the host network element via the external interface.

Figure 13:
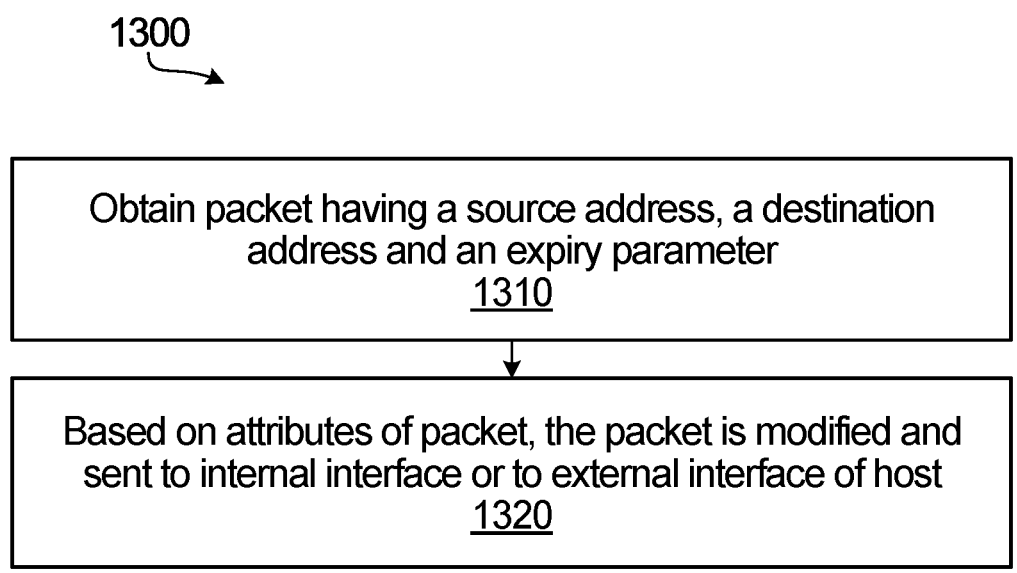

Referring finally to FIG. 13, which is a variant of FIG. 12, there has been described a method 1300 for execution by a processor of a host network element in a packet-based environment, the host network element implementing a container and a bridge network, the container being addressable by an internal address on the bridge network.

At step 1310 of the method 1300, a packet having a source address, a destination address and an expiry parameter is obtained.

At step 1320 of the method 1300, based on attributes of the packet, the packet is modified and sent to the internal interface or to an external interface of the host network element. It is noted that if the packet is received/obtained from the internal interface and the source address of the packet is the internal address of the container and the destination of the packet is a multicast group address, then (i) the aforementioned modifying leads to increasing the expiry parameter of the packet and setting the source address of the packet to be the address of the host, and (ii) the aforementioned sending leads to sending the modified packet to the external interface of the host network element.

The computer-readable storage medium referred to above can be a tangible device that can retain and store instructions in non-transitory form for use by an instruction execution device, such as a processor. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer-readable program instructions described herein can be downloaded to respective computing/processing devices from such computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives/obtains computer readable program instructions from the network and forwards the computer-readable program instructions for storage in the computer-readable storage medium within the respective computing/processing device.

The computer-readable program instructions for carrying out operations of the present disclosure may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the host or partly on the host and partly on a remote computer. In the latter scenario, the remote computer may be connected to the host through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer-readable program instructions to personalize the electronic circuitry, in order to perform aspects of the present disclosure.

Aspects of the present disclosure are described herein with reference to flowchart/signal flow illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

Additionally, reference throughout this disclosure to "one embodiment," "exemplary embodiment," or "an embodiment" means that a particular feature, structure or characteristic described in connection with the embodiment is included in at least one embodiment of the present disclosure. Thus, appearances of the phrases "in one embodiment," "in an exemplary embodiment," or "in an embodiment" in various places throughout this specification are not necessarily all referring to the same embodiment, although this may be the case in some instances. Furthermore, the particular features, structures or characteristics may be combined in any suitable manner, as would be apparent to one of ordinary skill in the art from this disclosure, in one or more embodiments. Similarly it should be appreciated that, in the above description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention more features are features are required than are expressly recited in each claim. Rather, as the following claims reflect, aspects may lie in less than all features of a single foregoing disclosed embodiment. Thus, the claims following the Detailed Description are hereby expressly incorporated into this Detailed Description, with each claim standing on its own as a separate embodiment. Furthermore, while some embodiments described herein include some but not other features included in other embodiments, combinations of features of different embodiments are meant to be within the scope of the disclosure, and form different embodiments, as would be understood by those in the art.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in one exemplary embodiment herein. The particular choice for description herein with regard to a single exemplary embodiment is not to be taken as a limitation that the particular feature is only applicable to the embodiment in which it is described. All features described herein may be equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for execution by a processor of a host network element, the host network element having an external interface for connection to at least one other network element of a packet-based data network, the host network element storing a routing table in memory and implementing a container connected to a bridge, the method comprising:
    obtaining an indication of a request for the container to join a multicast group having a multicast group address;
    in response to the obtaining, sending via the external interface a request for the host network element to join the multicast group having the multicast group address;
    modifying the routing table so as to make the bridge a next hop for future packets obtained from the external interface and destined for the multicast group address; and
    setting up an expiry parameter increase for said future packets.

2. The method defined in claim 1, wherein the bridge isolates the container from other host functions.

3. The method defined in claim 2, wherein the other host functions comprise a routing function that uses the routing table to route the future packets.

4. The method defined in claim 3, wherein the bridge is implemented by a container engine, the container engine further implementing a bridge network that connects the container to other containers while being isolated from the other host functions.

5. The method defined in claim 1, wherein the host network element is addressable from outside the host network element by an IP address, wherein said request for the host network element to join the multicast group comprises a multicast join request message identifying the IP address of the host.

6. The method defined in claim 5, wherein the multicast join request is an IGMP request if the IP address is an IPv4 address or an MLD request if the IP address is an IPv6 address.

7. The method defined in claim 1, wherein the host network element is connected to a router via the external interface, wherein the router is addressable on the packet-based data network by an address and wherein said request for the host network element to join the multicast group is embedded in a packet having, as its destination address, the address of the router.

8. The method defined in claim 7, wherein the host network element is addressable on the packet-based data network by an external address, wherein said packet identifies the external address of the host.

9. The method defined in claim 1, wherein the host network element implements a kernel, and wherein the indication of the request for the container to join the multicast group comprises a notification message from the kernel.

10. The method defined in claim 9, further comprising the kernel obtaining the request for the container to join the multicast group via the container engine.

11. The method defined in claim 10, wherein the request for the container to join the multicast group comprises an IGMP request message or an MLD request message issued by the given container.

12. The method defined in claim 1, wherein setting up the expiry parameter increase comprises adding the multicast group address to a list stored in the memory.

13. The method defined in claim 12, wherein the host network element implements a routing process, wherein the routing process comprises consulting the list and increasing the expiry parameter of an IP packet obtained from the external interface if the destination address of the obtained IP packet is on the list.

14. The method defined in claim 13, wherein said increasing comprises incrementing.

15. The method defined in claim 1, the container being addressable by an internal address on a bridge network associated with the bridge, further comprising modifying the routing table so as to make the external interface a next hop for second future packets obtained from the bridge whose source address is the internal address of the container.

16. The method defined in claim 15, further comprising setting up an expiry parameter increase also for said second future packets.

17. The method defined in claim 16, wherein the host network element implements a routing process, wherein the routing process comprises consulting the list and increasing the expiry parameter of an IP packet obtained from the container engine if a destination address of the obtained IP packet is on the list.

18. The method defined in claim 17, wherein said increasing comprises incrementing.

19. The method defined in claim 16, the host network element being addressable by network elements other than the host network element by an external address, further comprising setting up an address change that sets the source address of said second future packets to be the external address of the host network element.

20. A host network element for use in a packet-based data network, comprising:
    a processor;

a memory operatively coupled to the processor;
an external interface operatively coupled to the processor and for connection to at least one other network element of the packet-based data network;
the memory storing a routing table and non-transitory computer-readable instructions;
the processor being configured to implement a container and a bridge and being further configured to execute the instructions thereby to carry out a method that includes:
   obtaining an indication of a request for the container to join a multicast group having a multicast group address;
   in response to the obtaining, sending via the external interface a request for the host network element to join the multicast group having the multicast group address;
   modifying the routing table so as to make the bridge a next hop for future packets obtained from the external interface and destined for the multicast group address; and
   setting up an expiry parameter increase for said future packets.

* * * * *